Figure 1:
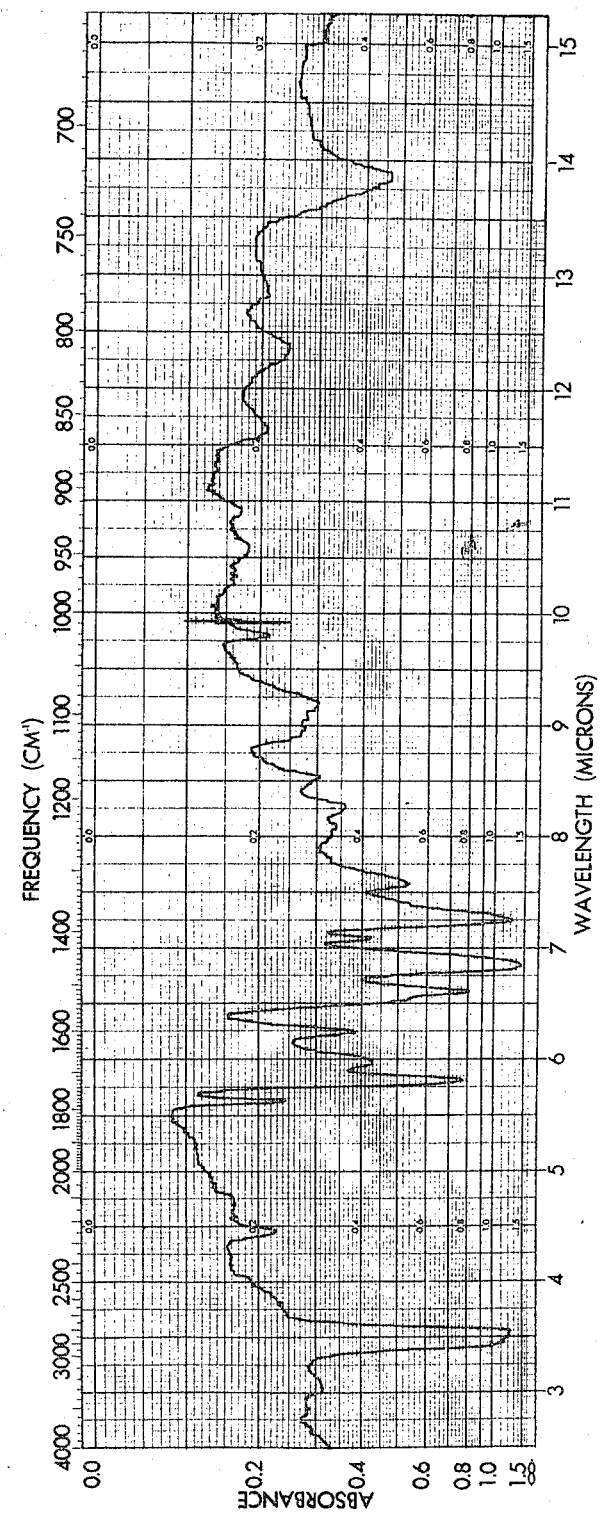

INVENTOR.
Horst E. Frey

United States Patent Office 3,300,420
Patented Jan. 24, 1967

3,300,420
FOAM RESINS PREPARED FROM AROMATIC
ANHYDRIDES AND ISOCYANATES
Horst E. Frey, Berkeley, Calif., assignor to Standard Oil
Company, Chicago, Ill., a corporation of Indiana
Filed Feb. 23, 1966, Ser. No. 536,517
16 Claims. (Cl. 260—2.5)

This application is a continuation-in-part of Serial Number 289,894, filed June 24, 1963, and Serial Number 290,230, filed June 24, 1963, both now abandoned. Serial Numbers 289,894 and 290,230 were in turn continuation-in-part applications of Serial Number 120,967, filed June 30, 1961, now abandoned.

This invention relates to the preparation of polymeric products prepared from aromatic anhydrides and polyisocyanates. In a particular aspect, it relates to the preparation of cellular plastic products having thermal stability and chemical inertness of value. In another aspect, the invention relates to the preparation of resins which have value in the preparation of molded and coated products.

In another aspect the invention relates to novel solid polymeric products of trimellitic anhydride and aryl polyisocyanates. These products of the invention are characterized by unusual thermal stability and chemical inertness. Surprisingly, the novel products of the invention, in preferred form, are flame-resistant and maintain their structural integrity at elevated temperatures for prolonged periods, even though they are essentially organic in nature.

It has been discovered that resins of value as foamed or molded products may be obtained when an aromatic anhydride having an additional reactive substituent is reacted with a polyisocyanate. It has been discovered that either self-foamed cellular plastic products of special value as insulators or dense molding resins can be obtained according to the reaction conditions. Further, it has been discovered that by appropriate adjustment a resin useful as a molding compound or a soluble synthetic resin useful as a coating can also be obtained. Other aspects of the invention will be apparent in the detailed description thereof.

In another aspect of the invention, it has been discovered that unusual organic polymers may be prepared by reacting, in the liquid phase and at elevated temperatures, trimellitic anhydride and aryl polyisocyanates, where the polyisocyanate contains at least two interconnected aromatic rings having at least one isocyanate group per aromatic ring. The polymeric products of the invention may be made by direct reaction, or they may be made from "prepolymers," which may be regarded as intermediate reaction products capable of further reaction to obtain the finished polymeric products. (In a strict sense, the term "prepolymer" as applied to these intermediates is somewhat of a misnomer, as the intermediate is not necessarily polymeric in structure.)

THE REACTION SYSTEM

The above-mentioned resins represent reaction products of a reactant having an anhydride group and a reactant having at least two isocyanato groups. The anhydride reactant has a benzene, naphthalene diphenyl, diphenylketone or diphenyl ether nucleus which nucleus carries an anhydride group. The anhydride reactant has at least one additional reactive substituent; the additional reactive substituent is a carboxyl group, a hydroxyl group, an anhydride group or an amino-type group ($NH_n$) containing one or two hydrogens. The carboxyl group is preferred. Non-reactive substituents may be present on the nucleus, for example, alkyl groups containing 1–4 carbon atoms, nitro groups, halides such as chlorine or bromine. The terms "reactive" and "nonreactive" respectively refer to the behavior of the functional group toward isocyanate under the conditions of reaction of the process.

Thus, the aromatic anhydrides suitable for use herewith have in general at least one additional substituent which is reactive with an isocyanate group. Such reactive substituents include substituents containing "active" hydrogen groups, and which as is known react as a consequence with Zerewitinoff reagent (methyl magnesium bromide in a high boiling ether). Such active substituents include hydroxyl groups, primary and secondary amino groups, carboxyl groups, and other groups containing "active" hydrogen (for a comprehensive listing see Kharasch and Reinmuth, "Grignard Reactions of Non-metallic Substances," pages 1169–1171, Prentice-Hall, 1954). In addition to such groups containing Zerewitinoff hydrogens, as defined above, the isocyanato-reactive groups may comprise another intramolecular anhydride group, as in the case of pyromellitic di-anhydride type structures.

Illustrative anhydride reactants are: pyromellitic dianhydride, trimellitic anhydride (the anhydride of trimellitic acid), hemimellitic anhydride, isatoic anhydride (the anhydride of N-carboxy anthranilic acid), hydroxyphthalic anhydride, aminophthalic anhydride, methyltrimellitic anhydride, aminonaphthalene 1,8-dicarboxylic anhydride, 4'-carboxy dipnehyl-1,3,4-dicarboxylic anhydride, di(phenyldicarboxylic anhydride) ketone, and di(phenyldicarboxylic anhydride) ether.

The aromatic, or aryl polyisocyanates which are preferred according to the invention are those compounds containing one or more aromatic nuclei and two or more isocyanato groups. For example, among these polyisocyanates having a linked biphenylene structure as indicated below:

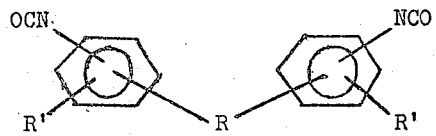

Examples of such diphenyl diisocyanates are bitolylene diisocyanate (3,3'-bitolylene-4,4'-diisocyanate), diphenylmethane-4,4'-diisocyanate, 3,3'-dimethyldiphenylmethane-4,4'-diisocyanate, xylylene diisocyanate, diphenylxylylene diisocyanate, and substituted derivatives thereof such as dianisidine diisocyanate and dichloroxylylene diisocyanate. Thus, in the foregoing formula, R' may be an alkyl group of 1–4 carbon atoms or an aryl group while R may represent a direct linkage, in the case of diphenylene structures, or an inert linkage such as is provided by methylene, oxygen, cumylene, sulfide or sulfone, for example.

Other polyisocyanates of value are monophenylene polyisocyanates represented by, for example, compounds within the formula below

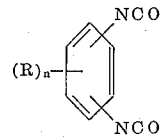

In the above formula, n is 0–4 and R is an alkyl group of 1–4 carbon atoms. Examples of monophenylene diisocyanates are tolylene diisocyanate (e.g., the 65% 2,4-isomer and 35% 2,6-isomer, the 80% 2,4-isomer and 20% 2,6-isomer, or the 100% 2,4-isomer all of which are available), metaphenylene diisocyanate, 2,4-tolylene diisocyanate dimer, and xylylene diisocyanate. Non-hydrocarbon substituted monophenylene diisocyanates include methoxyphenylene diisocyanate, phenoxyphenylene diisocyanate, and chlorophenylene diisocyanate. The presence of inert substituents such as chlorine in the nucleus may be utilized in conventional fashion to modify the properties of the products of the invention. Moreover, polymerized products such as polyphenylpolymethylene polyisocyanates, having one or more isocyanato groups per ring, may be used. Aliphatic or cycloaliphatic polyisocyanates can also be used. Examples are hexamethylene diisocyanate and cyclohexane diisocyanate.

Ratios of polyisocyanate to the defined anhydride reactant, in terms of isocyanato groups to moles of defined anhydride reactant, are advantageously between about 2:3 to 6:1. On the same basis, the ratio of isocyanato groups to anhydride reactant is advantageously between 2:1 and 3.6:1 and outstanding products are obtained with the preferred ratios, between 2.2:1 and 2.8:1. Part of the above-defined anhydride reactant, however, may be replaced by a polycarboxylic acid; it is sometimes desirable to replace up to about one-half in order to modify the properties of the products or substitute a less expensive for more expensive reagents. Illustrative of useful polycarboxylic acids are: terephthalic acid, isophthalic acid, orthophthalic acid, adipic acid, succinic acid, 2,5-dichloroterephthalic acid, trimesic acid and the like.

Various materials which act as modifiers, catalysts or accelerators for the reaction may be utilized in small amounts. Tertiary amines are useful for this purpose; N-substituted morpholines such as N-ethylmorpholine and N-cocomorpholine are illustrative. Alkali metal salts such as lithium ricinoleate, sodium oleate have a pronounced catalytic effect. Heavy metal salts illustrated by cobalt acetate and cobalt naphthenate may also be utilized. Metal salts of weak acids are preferred and it is of advantage to react them first with part or all of the anhydride components, especially if the latter possesses a carboxyl group. Further, small amounts of primary and secondary amines particularly those possessing a fatty acid substituent, and fatty acid amides, may be utilized in this regard. Also the primary and secondary amines are advantageously first reacted with part or all of the anhydride reactant.

The polymeric products of the process of the invention may be produced in foam-form or as dense compression-molded products or, in certain cases, as surface coatings. The reaction between aromatic anhydrides and polyisocyanates according to the invention evolves carbon dioxide; if the reaction is carried to completion with minimal confinement of the polymer, a foam of uniform cell structure and excellent physical properties is obtained. If the reaction is not carried to completion and the intermediate material is compression molded, a homogeneous solid product is obtained which has an unusual combination of hardness, strength, and freedom from brittleness. An unusual feature of the resulting polymers, whether in foam or compacted solid form, is that they are somewhat thermoplastic and have resistance to virtually all common solvents, the latter property generally being associated only with thermosetting plastics.

PREPARATION OF FOAM-FORM RESINS

The polyisocyanate is in a liquid state. If the polyisocyanate is a solid, it should be converted to a liquid by heating. For example, tolylene diisocyanate is a liquid at ordinary temperatures; on the other hand, diphenylmethane-4,4'-diisocyanate is a solid at ordinary temperatures and melts at about 120° F. The polyisocyanate is charged to the reaction zone in a liquid state or brought to the liquid state in the reaction zone. Then the anhydride reactant is charged to the reaction zone containing the liquid polyisocyanate. The anhydride is dissolved into the polyisocyanate to form a homogeneous liquid solution. In most instances it may be necessary to heat the material in the reaction zone in order to bring all of the anhydride into solution. Agitation is provided during the solution preparation.

For most reactant combinations, the reaction will be initiated during the solution period as evidenced by some gas evolution. The temperature is raised to a point where the reaction proceeds at a suitable rate. The liquid solution is heated and agitated to release gas formed by the reaction; sufficient agitation desirably is provided to break up any froth formed in the reaction zone. As the heating and agitation continue, the liquid becomes more and more viscous until a point is reached where in spite of the agitation an expanding foamy mass is produced in the reaction zone. For each set of reactants, there is a readily predeterminable viscosity at which heating and agitation is preferably terminated and the viscous liquid is permitted to react with the consequent production of gas which forms an expanding foamy mass in the reaction zone. The limiting factor in viscosity increase may be associated with incipient solidification.

The foamy mass will solidify on cooling producing a cellular plastic product. The properties of the products depend in general upon the extent to which the polymerization reaction is carried, i.e. the degree of "cure." For example, products which have been produced by reaction at temperatures upwards of 450 to 500° F. and at reaction times for a batch system, of 15 minutes or more are generally well-cured, rigid foams of good strength. Continuous reaction systems providing good thermal contact result in reduced reaction times. Products prepared at lower temperatures, e.g., 350° to 400° F. and/or shorter times are less fully cured, which can be used to advantage in preparing prepolymerized intermediates which can then be further reacted in situ during fabrication into finished products. For example, a fully-cured solid foamed resin product, i.e. cellular plastic product, is obtainable by heating in the following manner. The liquid solution is heated so that a temperature of about 500° F. will be attained in the reaction zone at the time that the liquid reaches the predetermined high viscosity. In the case of trimellitic anhydride-diphenylalkane diisocyanate, the temperature will be about 500° F. The addition of heat and the agitation are discontinued; the viscous liquid continues to react under exothermic conditions forming an expanding foamy mass. It has been observed that the temperature in the interior of the mass continues to rise following termination of the addition of heat and may reach temperatures on the order of 600 or even 700° F. By the time the foamy mass has cooled to room temperature, a very strong cellular product is obtained.

A foamed resin having much lower initial strength is obtained when the heating is not carried out in the above-described manner; however, these resins can be cured by heat treatment to obtain foamed resins with strength comparable to those obtained above. These resins of lower initial strength are obtained by heating in the following manner. The liquid solution is slowly heated with a minimum of external heat so that when the liquid reaches a desirable viscosity the temperature is below 500° F., more usually on the order of 350 to 450° F. Depending upon the temperature conditions, the foamed resin produced may vary in initial strength. The type obtained at lower foaming temperature is initially of poor strength. It can easily be converted to a product of high strength without dimensional change by heating for at least one hour at about 400° F. or higher.

Intermediate materials obtained through reaction under controlled conditions, particularly of temperature and time, can be ground into powders, which can be compression molded into hard, dense, rigid, strong articles of definite shape. The same type of intermediate materials may be charged into molds and foamed in these molds by heating. Foamed articles of definite shape possessing a uniform crust on the outside are obtained. Intermediate material with a reduced proportion of one of the reactants can be further reacted by adding the quantity of reactant originally withheld, and heating. Foams produced possess the same properties as those when the reaction is carried out without interruption.

In general, the cellular plastic products have a density of from about 1 to 4 pounds per cubic foot. They possess in general unusual resistance for organic materials, to heat and open flames. Also, the products are non-flammable and are therefore useful in heat insulation such as pipe covering, insulation of ovens, insulation of walls for fireprof buildings and the like. The cell structure of the foamed products is improved through certain additives, for example, a small amount of silicone. The silicone additives are employed in amounts of 2% or less; amounts in the order of 0.2% are effective, depending on the type of silicone used. Particularly effective are polymethylsiloxanes and polyphenylmethylsiloxanes; also very effective are silicone copolymers or block polymers where a polyalkyl or polyalky aryl sioxane contains ether and/or hydroxy groups. Mixtures of the straight substituted polysiloxane type and the copolymer and/or block polymer type are desirable.

PRODUCTS PREPARED FROM TRIMELLITIC ANHYDRIDE AND ARYL POLYISOCYANATES

The novel products of the invention prepared from trimellitic anhydride and aryl polyisocyanates are especially desirable. They may be produced in the form of self-foamed polymers, having a wide range of potential value as lightweight insulating materials, or as homogeneous solid resins in the form of dense compression-molded products. The novel products also may be produced in an intermediate state as "prepolymers," for example, in the form of self-foaming powders, or in the form of powders or compositions for use in compression molding, or in the solution coating of various articles.

These polymeric products of this aspect of the invention may be advantageously either foams or dense compression-molded products. The reaction between trimellitic anhydride and aryl polyisocyanates evolves carbon dioxide; if the reaction is carried to completion with minimal confinement of the polymer, a foam of excellent mechanical structure and physical properties is obtained. The formation of the foam can be controlled by the manner of heating or by use of additives to vary the cellular structure, density and rigidity of the product as may be desired for particular end-uses. Intermediate materials obtained through reaction under controlled conditions, particularly of temperature and time can be ground into powders which can be compression molded into hard, dense, rigid strong articles of definite shape. An unusual feature of the new polymeric products, both in foamed or compacted solid form, is that they are somewhat thermoplastic and have resistance to virtually all common solvents, the latter property being generally associated only with thermosetting plastics.

According to this aspect of the invention, the novel polymeric products are advantageously in foam-form or in the form of dense homogeneous resins of rigid structure having unique high temperature resistance. Their exact chemical structure is at present not fully understood, but it is believed that the reaction between aryl polyisocyanates and trimellitic anhydride, depending in part upon the reacting proportions, may give rise to a variety of structural linkages. Surprisingly, amide linkages, which would be logically expected, do not appear to be present in the polymer according to infrared data, at least to any significant extent. Amides show infrared absorption at a wave length of 6.0 to 6.1 microns, but available spectral data do not show such absorption for the products of the invention. However, definite absorption bands appear in the region of 5.95 microns where known mono-substituted amides show no absorption.

Although the interpretation of the infrared spectrum is subject to dispute, it appears that there is crosslinking in the structure of the polymeric products. Infrared spectral analysis is generally considered one of the best techniques available for analytical study of functional group reactions. Because of the structural complexity of the new products and because of the lack of available standards necessary for comparison, interpretation of the infrared spectra for the new products has proved difficult and has been subject to differing opinions.

On the basis, however, of the best present interpretation of such infrared data, the reaction forming the novel polymers of the invention appears to involve, in the first instance, the free carboxyl group of trimellitic anhydride and an isocyanato group which react to form an amide group. This group further reacts with an isocyanato radical on another polyisocyanate molecule, possibly through the mechanism of a preliminary transitory lactam-lactim (Wheland, "Advanced Organic Chemistry," pages 617–621, John Wiley & Sons). The resulting crosslinked structure may include a urethane-type linkage, an acyl urea, or other polyurea-type structure. These structures are all consistent with the determinations of carbon dioxide evolution and elemental analyses that have been made, but the infrared spectra data available do not discriminate between such linkages. The infrared spectra, however, do show the presence of cyclic imide bonds, presumably resulting from the condensation of an anhydride group and an isocyanato group with release of carbon dioxide.

When compact solid-form polymers are made pursuant to the invention, their physical properties do not correspond definitely with either conventional crosslinked (thermosetting) or linear (thermoplastic) polymers. For example, the novel products exhibit the heat-resistance and inertness to boiling solvents normally expected only from crosslinked polymers but on the other hand show a degree of thermoplastic behavior characteristic only of linear polymers. For example, they have no sharp yield point upon slow compression or flexure.

The aryl polyisocyanate reactants useful in preparing the products of the invention by reaction with trimellitic anhydride contain at least two interconnected aromatic rings having at least one isocyanato group per ring. The rings may be interconnected by condensation, as in naphthalene or in phenanthrene-type structures, or may be bridged, either directly as in diphenyl diisocyanates, or indirectly, as for example, with methylene, oxygen, cumylene, sulfide or sulfone. Other linkages which are stable under reaction conditions and which do not deleteriously affect the polymer product may be employed in whole or in part. In addition, the polyphenyl polymethylene polyisocyanates may be used. The position of the isocyanato group on the ring may be either meta or para to the bridge. Specific examples of suitable aryl polyisocyanates for use with the invention include: diphenyl methane - 4,4' - diisocyanate, diphenylmethane-3,3'-diisocyanate, naphthalene diisocyanate, diphenyl diisocyanate, diphenylether diisocyanate, diphenylketone diisocyanate, diphenylsulfone diisocyanate, diphenylsulfide diisocyanate and diphenylpropane diisocyanate.

Ratios of aryl polyisocyanate to trimellitic anhydride, in terms of isocyanato groups to anhydride groups, between about 2:3 to 6:1 are useful. The ratio of isocyanato groups to anhydride groups is preferably between 2.0 and 3.6 to 1, and optimally between about 2.2 and 2.8 to 1.

If desired, a portion of the trimellitic anhydride in the reaction charge may be replaced by an aromatic or aliphatic polycarboxylic acid, as discussed in the section on The Reaction System.

The reaction between trimellitic anhydride and the aryl polyisocyanate is conducted at elevated temperature and in the liquid phase. The reaction temperature is ordinarily maintained above about 300° F., and the reaction proceeds at a substantially more rapid rate at temperatures within the range of about 350–400° F. Higher temperatures are not deleterious, and indeed in many situations provide a superior product. Also, as the temperature of reaction is increased, the reaction time is reduced.

When the trimellitic anhydride and aryl polyisocyanate are combined at elevated temperature, a homogeneous solution is formed and carbon dioxide evolution commences almost immediately. For best results, vigorous agitation should be provided during the reaction.

If the reaction mixture is heated to above around 350° F., the reaction rate (as evidenced by carbon dioxide evolution) increases substantially. Agitation should then be applied with sufficient severity to avoid frothing or to break up froth which may form. As the reaction continues, the liquid-gas mixture becomes more and more viscous until the gas can no longer be separated; as this point, and desipte agitation an expanding foamy mass is produced, which will gradually solidify.

The temperature of the reaction mass just prior to the stage at which the expanding foamy mass begins to form affects the properties of the final polymer product. For instance, when trimellitic anhydride and diphenylmethane-4,4′-diisocyanate are heated to a temperature of above around 450° F., and preferably of around 500° F., the resulting viscous liquid reaction mixture containing entrained or occluded gas bubbles, will increase in temperature because of the exothermic heat of reaction. Temperatures in the range of about 500–600° F., and even as high as about 700° F. lead to the production of well-cured solid foam-form products after cooling. When the temperature is maintained below about 400° F., preferably about 300–400° F., the exothermic temperature rise following the characteristic increase in viscosity will not be so high. The resulting foam will have relatively less physical strength, but its strength may be improved without dimensional change by heating for a few hours at about 400–500° F. A similar phenomenon occurs with other polyisocyanate reactants; however, temperature levels referred to above (and in subsequent examples) will tend to vary according to the nature of the isocyanate and its degree of purity.

Foam density may be regulated by confining the foaming viscous mass to a predetermined volume as well as by the thermal conditions of the preparation. In general, the final cellular product will have a density within the range of about one to about three or four pounds per cubic foot. The resulting foams are heat-resistant and non-flammable; they may be used for prolonged periods at temperatures of around 400° F. to upwards of about 500° F. They retain their dimensional stability and structural integrity for short-term exposures at temperatures of about 1000° F. Indeed, a propane-air torch flame will heat these new foams to cherry red temperatures and although the foams carbonize, this occurs without excessive shrinkage. Further, the foams are efficient insulators of heat and of electricity and are resistant to boiling organic solvents. The foams may be exposed for prolonged periods to water or to high humidity atmospheres.

This unique combination of chemical and physical properties, as described above, permits use of the foams in many applications where use of organic foam insulation would be ideal, but where conventional urethane or styrene foams are unsuitable, for example, in insulation of process piping, ovens, fireproof buildings and vans, supersonic aircraft, and like applications.

Various materials act as modifiers, catalysts or accelerators for the polymerization reaction and hence may be utilized in small amounts, as is discussed in the section entitled The Reaction System.

When the polymer is to be produced or used as a foam, it has been found that cell structure may be advantageously made more uniform or otherwise controlled by including a small amount of silicone polymer with the reactants. This has been discussed in detail in the section entitled Preparation of Foam-Form Resins. Either open or closed type cellular structures may be produced by use of such additives as is known to the plastic foam art.

According to a special aspect of the invention, so-called "prepolymers" or intermediate materials may be made under controlled conditions and later used to produce the novel foams and molded polymeric products of the invention. According to this aspect of the invention, the proportion of either reactant may be reduced so as to prepare an intermediate "prepolymer" deficient in either the trimellitic anhydride or isocyanate or the reactants may be employed in the ratios leading to finished products or polymers as described earlier. This technique may offer practical advantages such as improved storage stability of the intermediate, more economical shipping weight, better handling characteristics and the like. The intermediate, when deficient in one of the reactants, can be converted into the ultimate desired end product by adding the initially deficient reactant so that the ratio of isocyanato groups to moles of trimellitic anhydride in the final product will be within the desirable range of about 2:1 to 3.6:1. Many useful varieties of the "prepolymers" can be prepared using varying temperatures and times. Temperatures over a wide range, from about 300° F. to about 700° F. may be used, depending on reaction conditions, particularly time. At very high temperatures the reaction time may be on the order of a minute or less. At lower temperatures considerably longer times are needed. They may be prepared by various techniques and may be shipped and stored as described below.

One type of prepolymer, which is primarily adapted for producing free rise foams, may be obtained by reacting an excess of trimellitic anhydride with an aryl polyisocyanate, e.g. about 3 moles of anhydride per mole of polyisocyanate. The reaction is conducted below about 400° F.; the peak temperature resulting from exothermic effects may be on the order of about 425° to upwards of 450° F. Approximately five to thirty minutes, usually about fifteen minutes, are required in a batch system. The reaction period can be considerably shortened in a continuous reaction system providing good thermal contact. Mixing is continued until the temperature drops to about 380° F. There is little gas evolution and virtually no tendency toward foam formation. The product is cooled. The resulting product is frangible and may be readily pulverized.

Figure 2:
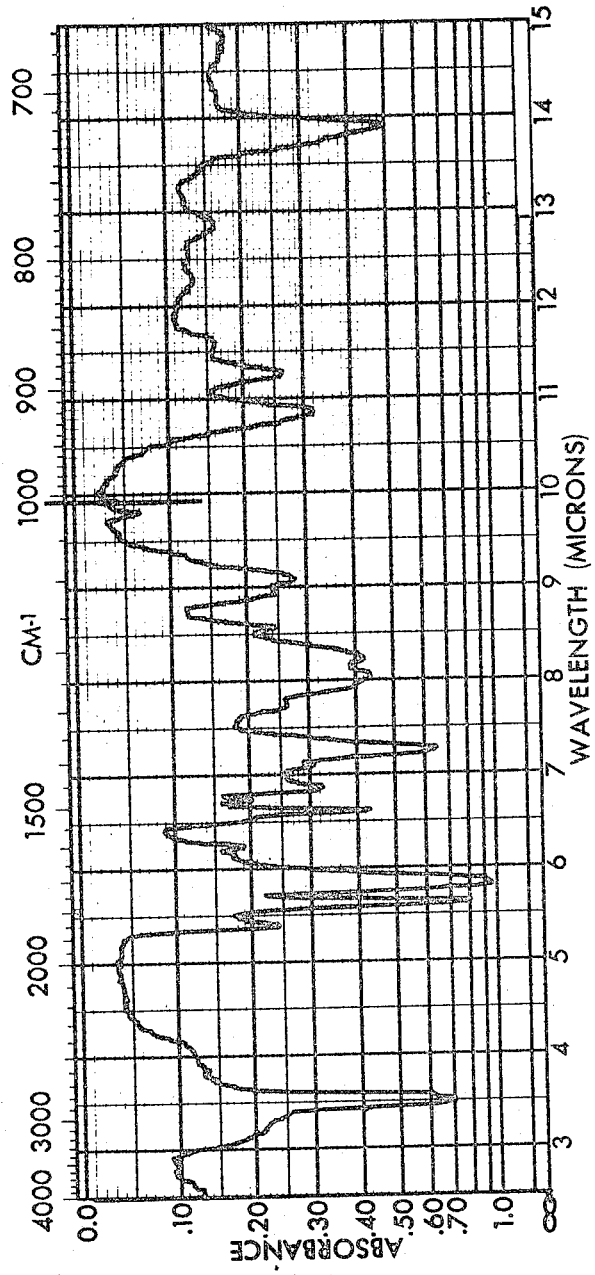

Physical properties of a typical prepolymer prepared as above described are:

Appearance _____ Greenish yellow powder.
Bulk density _____ 927 g./liter, 7.7 lbs./gal.
Softening point ___ 135° C.
Melting point _____ 162° C.
Solubility _____ Soluble partially in cyclohexanone; soluble in dimethylformamide.
IR spectrum _____ Attached hereto as FIGURE 2 of the accompanying drawings.

In the preparation of foams from this type of prepolymer, additional polyisocyanate is added to bring the equivalent ratios within the preferred ranges, described above in connection with the preparation of the finished foam products of the invention. Polymerization is effected by heating, e.g. to about 380° F. or higher, with intense mechanical agitation for 10–15 minutes until frothing subsides and the mixture has thickened, followed by heating to a temperature between about 410° and about 440° F. Curing is effected at a temperature of at least about 400° F.

Figure 3:
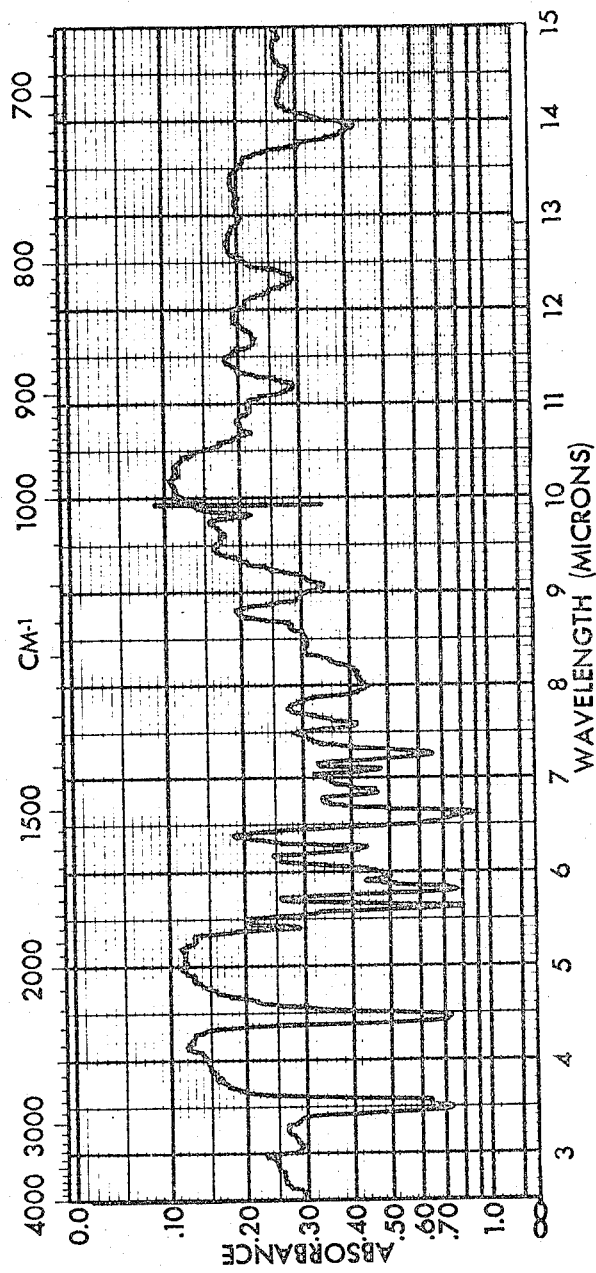

A second type of prepolymer, which is particularly useful in foam molding applications, is obtained by reacting a polyisocyanate and the anhydride, in proportions corresponding to those desired in the final product, at an elevated temperature below that necessary to complete the polymerization reaction, e.g. about 350–400° F., preferably about 390° F. When this temperature has been reached, after a gradual rise over a period of about 10 to 15 minutes with intense agitation, heating is discontinued but agitation is continued. An adiabatic and exothermic peak temperature of about 400° F. to as high as about 450° F. may be attained depending on the grade of isocyanate employed. For example, with a crude polymethylene polyphenol polyisocyanate, the peak should not exceed 400° F. after a reaction time of 10 to 15 minutes; whereas with pure diphenylmethane-4,4'-diisocyanate, the peak temperature should be about 430°–450° F. after a reaction time of 10 to 15 minutes. After cooling with agitation, the hot fluid reaction mass rapidly solidifies. The product is easily broken up and pulverized. (It is particularly advantageous to include an additive such as a substituted fatty acid amide or epoxidized soy bean oil to the prepolymer in order to obtain a uniform foam structure upon subsequent heating). This prepolymer readily forms a strong non-brittle foam, with fine uniform cells, upon heating to 500° F. in an enclosed sheet metal mold for about 30 minutes. Properties of a typical prepolymer are given below:

| | |
|---|---|
| Appearance | Greenish yellow powder. |
| Bulk density | 754 g./liter, 6.3 lbs./gal. |
| Softening point | 156° C. |
| Melting point | 173° C. |
| Solubility | Soluble in cyclohexanone, dimethylformamide. |
| IR spectrum | Attached hereto as FIGURE 3 of the accompanying drawings. |

Figure 4:
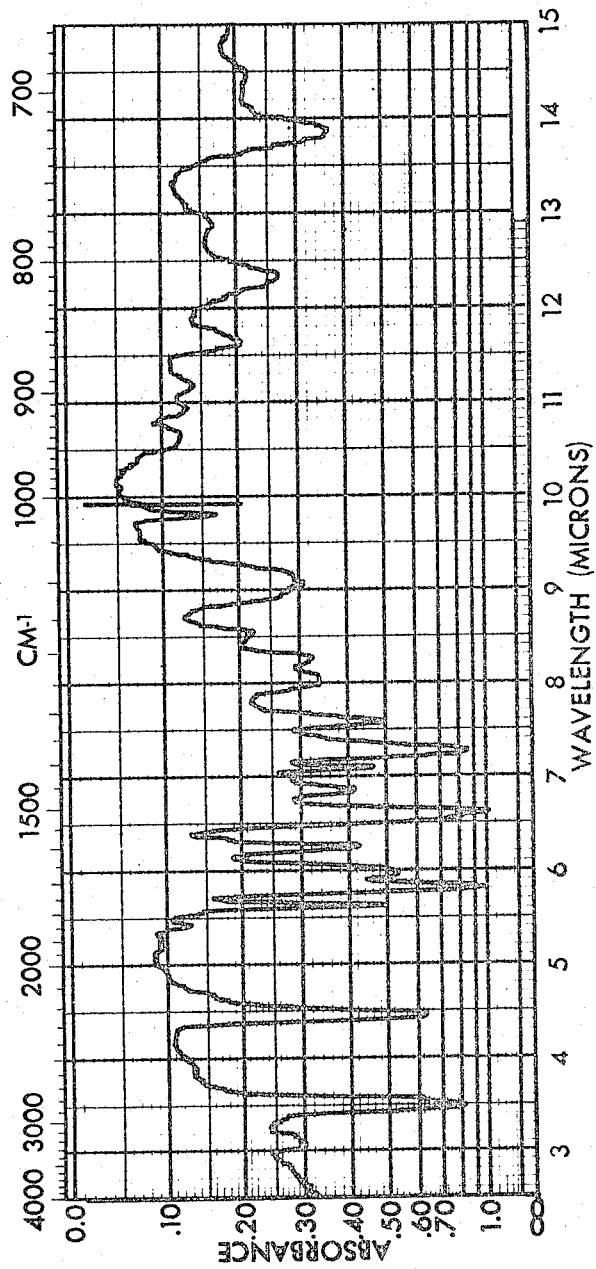

A third type of prepolymer is especially useful in compression molding of a polymer to form a solid homogeneous product. Such a prepolymer may be prepared by reacting trimetllitic anhydride and an aryl polyisocyanate in the proportions ultimately desired. In heating the reaction mixture, however, the temperature is limited to about 440° F. in about 10 to 15 minutes in a batch, agitated system. Heating is then discontinued and the reaction is permitted to continue exothermically with intense agitation. After the temperature reaches is peak, which should be in the order of 450–460° F. in case of 1 mole TMA and 1.4 moles pure diphenylmethane-4,4'-diisocyanate, agitation is continued until the temperature falls to around 400° F., at which time the fluid reaction mass is cooled. The solid prepolymer is easily broken into small particles, and has the following characteristics:

| | |
|---|---|
| Appearance | Yellow powder. |
| Bulk density | 668 g./liter, 5.6 lbs./gal. |
| Softening point | 200° C. |
| Melting point | 212° C. |
| Solubility | Soluble in dimethylformamide at 140° F. Solution gels within a short time. |
| IR spectrum | Attached hereto as FIGURE 4 of the accompanying drawings. |

Compression molding with the above prepolymer may be accomplished, for example, under about 6 tons per square inch pressure at 500° F., with a 15-minute heating time and a 15-minute cooling time, both under pressure. A disk molded according to the foregoing technique has the following characteristics:

| | | |
|---|---|---|
| Specific gravity | | 1.3 |
| Tensile strength | p.s.i. | 15,000 |
| Tensile elongation | percent | 18 |
| Barcol hardness | | 75 |
| Deflection temperature | ° C. | 240 |

After exposure of the plastic for a period of seven days to a temperature of 400° F., the following properties were recorded:

| | | |
|---|---|---|
| Tensile strength | p.s.i. | 14,000 |
| Tensile elongation | percent | 11 |
| Weight loss | do | 4.3 |

After exposure of the plastic for a period of seven days to a temperature of 180° F., in water, the properties were:

| | | |
|---|---|---|
| Tensile strength | p.s.i. | 14,000 |
| Tensile elongation | percent | 14 |
| Weight gain | do | 1.2 |

Preparation of several examples of the polymeric products of the invention will be illustrated below. It is to be understood that the working examples are illustrative only and are not intended to limit the scope of the invention.

Example 1

In this example, an illustrative preparation following the above procedure was conducted. 44 grams of diphenylmethane-4,4'-diisocyanate were melted gently in an 800 ml. beaker with continuous agitation. After 16 minutes when the temperature of the melt was 390° F., 24 grams trimellitic anhydride were added. After four minutes, the temperature was 485° F. and shorty thereafter agitation was stopped. As a yellow foam cake developed, the beaker was covered with a metal plate in order to prevent expansion in excess of the volume of the beaker. After cooling, the foam cake was removed from the beaker and was postcured for two hours at 350° F. The density was 2.1 lbs./cu. ft., the compressive strength was 11.5 lbs./sq. in. The modulus was 624 p.s.i.

Example 2

In this example, 1 mole of diphenylmethane-4,4'-diisocyanate was melted; a clear liquid was obtained at 220° F. At that temperature, 1 mole of trimellitic anhydride was dissolved in the melted diisocyanate and a clear solution was obtained. A gas-producing reaction started simultaneously with solution of the anhydride. The temperature was slowly raised to 300° F., held there for about 20 minutes, then raised to 330° F.; carbon dioxide evolution was continuous. Upon still further heating with continuous agitation, after 30 minutes to one hour at 350° ±10° F., a strong, gas-producing reaction took place with concurrent solidification of the previously fluid substance, resulting in an expanding foamy mass. The product was a rigid foam of yellow color and a density of approximately 1 lb. per cu. ft. Exposure to 500° F. for 30 minutes did not affect the appearance and dimensional stability of the material; it felt firm and rigid at that temperature. The material was insoluble in dimethylformamide. This foam was not brittle and was resilient and of good strength.

Example 3

87.5 grams of diphenylmethane-4,4'-diisocyanate were slowly heated in a beaker under nitrogen and with moderate agitation. When the melted material had a temperature of 385° F., 48 grams of trimellitic anhydride were added. A gas-producing reaction started. After a few minutes, the mixture was clear and deep yellow to red. The temperature rose quickly to about 500° F. and the gas development became more rapid. Agitation was continued until a foam cake developed.

The yellow foam cake was removed from the container and cured for two and a half hours in an oven at 400° F. Samples of the foam had the following properties: Density—1.5 lbs./cu. ft.; compressive yield strength—5 p.s.i.; tensile strength—43.4 p.s.i.; elongation—36% The total time to prepare the above foam required 35–40 minutes.

Example 4

In this example, isophthalic acid is added as an ingredient of the polymer, ½ mole of trimellitic anhydride, ½ mole of isophthalic acid and 1.4 moles of diphenylmethane diisocyanate were reacted by heating and agitating the materials until the temperature of 450–500° F. was reached. The rapid agitation was continued until most of the frothing of the reacting mass had ceased. A foam developed within several minutes. The product had the following properties; Density—4 lbs./cu. ft.; compressive strength—48 p.s.i. The product was dimensionally stable and showed no significant loss in physical properties after exposure to 400° F. for two weeks or after immersion in water at 150° F. for two weeks.

*Example 5*

36 grams of trimellitic anhydride, 64 grams of methylene diphenyldiisocyanate and 1 gram of cobalt naphthenate in a naphtha solution (6% cobalt metal), were heated together under rapid agitation. After about two minutes at 280° F., a strong rise in viscosity was observed. One minute later, agitation had to be discontinued and a plastic foam rapidly developed.

The experiment was repeated except that the mixture was heated to 350° F. or thereabouts, and it was found that a product of greater strength was obtained. Only one-third or less of the time ordinarily required to prepare trimellitic anhydride-methylene diphenyldiisocyanate foam is needed with cobalt naphthenate present. The properties of the product are similar to those of the product obtained from an uncatalyzed reaction.

*Example 6*

The following materials were charged into an aluminum reaction pan provided with mixers at a temperature of 380° F. in the following order:

| | Grams |
|---|---|
| Crude commercial diphenylmethane diisocyanate | 850 |
| Trimellitic anhydride flakes | 475 |
| DC-710 silicone (polymethyl phenyl siloxane) | 17 |
| DC-113 silicone (polyalkyl or polyalkyl aryl siloxane having ether and/or hydroxyl groups) | 3 |

Immediately after charging, the mixers were lowered into the reaction pan, switched into operation, and constantly moved back and forth so as to thoroughly mix the entire contents of the pan continuously. After 14 minutes, the temperature of the reaction mass was 446° F., at which time the mass had become so viscous that further mixing would have been ineffective. The mixer assembly was removed and the pan immediately transported into a circulating oven having a temperature of 400° F. One hour later the foam cake was removed from the pan and further postcured for an additional hour at 400° F. The product thus obtained was a uniform plastic foam possessing the following properties:

| | |
|---|---|
| Density lbs. per cu. ft. | 1.08 |
| Compression set percent | 63.8 |
| K-factor | 0.217 |
| Compressive strength p.s.i. | 5.1 |
| Modulus p.s.i. | 221.4 |
| Tensile strength p.s.i. | 20.6 |
| Tensile elongation percent | 6.2 |
| Open cell contents do | 59.7 |

These properties underwent no significant change after specimens of the foam had been exposed to (1) Immersion in water at 180° F. for one week
(2) An oven at 400° F. for one week A significant property of the foam is that when it is exposed to a torch flame of high temperature, the foam neither melts nor burns and there is little fuming. The product forms a char while exposed to the flame.

*Example 7*

156.5 grams trimellitic anhydride and 295.5 grams crude diphenylmethane diisocyanate were charged to an aluminum pan. External heating and rapid agitation through a two-beater electric mixer were provided. The mixture was heated so that a temperature of 425° F. was reached after 12 minutes. Then the pan was removed from the heat source while mixing was continued, causing the temperature to slowly decrease. The mixer was removed when the mass became too viscous. A foam developed in room temperature environment. After cooling, the foam was removed from the reaction pan and was pulverized, except for a small center section that appeared to be in the cured state. A suitable quantity of the powder was placed into a match metal mold which was then mounted into a press. After compression for 15 minutes at a platen temperature of 425° F. and a pressure of 8000 p.s.i., a dark transparent, rigid sheet of ⅛″ thickness was obtained possessing the following properties:

ASTM D-790:
  Flexural strength _____p.s.i__ 14,000
  Secant modulus _____p.s.i__ 222,000
ASTM D-638-59T:
  Tensile strength _____p.s.i__ 9,000
  Tensile elongation_____percent__ 21
ASTM D-648-56:
  Deflection temperature _____° C__ 240

*Example 8*

48 grams trimellitic anhydride were reacted with 87.5 grams of polymethylene polyphenylisocyanate having an average molecular weight of 380–400 and an NCO equivalent of 129–132, in the presence of 0.25 g. of silicone, which is a siloxane polyoxyalkylene glycol polymer having both ethylene and propylene units at a temperature of about 400° F. The mixture was heated and agitation continued until the viscous mass began to form a foam and then placed in an oven at 400° F. After 30 minutes, the foam was removed from the oven. The properties of the foam obtained were: Density—1.4 lbs./cu. ft.; compressive strength—6 p.s.i.; modulus—250 p.s.i.

*Example 9*

This example illustrates the preparation of a prepolymer which is particularly suitable for the manufacture of free-rise foams.

The apparatus consists of four 1,000-watt hot plates upon which is placed a pan made from ¼″ thick aluminum, 14 x 18 x 1½ inches in size, containing a ¾″ thick layer of sand. On the sandbath is placed a pan made from 16-gauge stainless steel, 13 x 16½ x 4 inches in size. This pan is heated to an equilibrium temperature of 380° F. Mounted above this heated reaction pan is a freely movable assembly of three double-shaft portable electric hand mixers.

2000 grams of trimellitic anhydride and 850 grams of crude diphenylmethane-4,4'-diisocyanate are charged to the pan, preheated to 380° F. The materials are slowly mixed with a spatula until sufficient fluidity develops to permit the use of the electric mixers. After about 15 minutes, when a temperature of 370° F. has been reached, the pan is removed from the heat source while intense agitation is continued. Within one minute, a peak temperature of 410–430° F. is observed. Mixing is continued an additional two minutes until the temperature has dropped to about 380° F. (No cooling device is necessary as there is no tendency toward foam formation.) The cooled product breaks up easily in a Waring Blendor. The product is useful in the preparation of free-rise type foamed products, as previously described.

*Example 10*

In this example, a foam-molding type of prepolymer is prepared. The apparatus is that used in the preceding example.

1750 grams of crude diphenylmethane-4,4'-diisocyanate and 960 grams of trimellitic anhydride are charged to the pan at 380° F. 30 grams of Ethomid HT 15 (polyoxyethylene substituted hydrogenated tallow amide) is added after the first five minutes of mixing when the temperature is somewhere between 200 and 300° F. The mixture is continuously agitated until after about 15 minutes, when a temperature of 390° F. is reached. The pan is removed from the heat source and agitation is continued while the temperature rises to a peak of about 400° F. within about one minute. After another two minutes, when the temperature is down to about 380° F., the fluid reaction mass is cooled rapidly.

The product is useful in the preparation of a foam-molded product, as previously described.

Example 11

This example illustrates the preparation of a prepolymer suitable for compression molding applications.

1750 grams of pure diphenylmethane-4,4'-diisocyanate and 960 grams of trimellitic anhydride are charged to the heated pan and are distributed with a spatula. The mixture is continuously agitated while heating until, after about 15–20 minutes, a temperature of 440° F. is reached. The pan is removed from the heat source while maintaining agitation; the temperature rises to a peak of about 460° F. within the next minute and then slowly drops. When the temperature cools to about 400° F., a water-cooled copper tubing coil is immersed in the reaction mass, and the mass thereupon cooled rapidly. The product is pulverized.

Example 12

In this example, a foamed product was prepared and was extensively studied by infrared spectroscopic techniques; the spectrum is attached hereto as FIGURE 1 of the accompanying drawings.

To prepare the polymer, 96 grams of trimellitic anhydride and 175 grams diphenylmethane-4,4'-diisocyanate were mixed and heated with 0.5 gram silicone fluid (DC-113, a polyalkyl or polyalkyl aryl siloxane having ether and/or hydroxyl groups) to 450° F. in 15 minutes with intense agitation. The resulting foam was cured for one and one-half hours to 400° F. 2–5 grams of foam were obtained, with a density of 1.36 pounds per cubic foot (p.c.f.), a compressive strength of 11.5 pounds per square inch, and a modulus of elasticity of 270 p.s.i.

The foam was analyzed and found to contain 8.22 weight percent nitrogen, 13.5% oxygen, 3.90% hydrogen and 74.30% carbon.

Example 13

87.5 grams of diphenylmethane-4,4'-diisocyanate were slowly heated in a beaker under a nitrogen blanket and with moderate agitation. At 385° F., 54.5 grams of pyromellitic dianhydride powder were added. The material dissolved and the red liquid mass was further heated. After several minutes, at about 500° F., a brownish-red foam cake suddenly formed. The density was 1.5 lbs./cu. ft. and the foam was somewhat resilient.

Example 14

19.2 grams trimellitic anhydride and 23.5 grams hexamethylene diisocyanate (molar ratio 1:1.4) were reacted. The diisocyanate was melted and the anhydride added after about 5 minutes at a melt temperature of 320° F. An orange color developed which turned to brown upon further heating. Above 400° F., a slow and continuing rise in viscosity took place. At 475° F., after a total time of 15 minutes, foam formation occurred. The cake in the container was placed in an oven at 350° F. for 45 minutes. The foam was highly elastic at 350° F. but was hard at room temperature. The color was light tan.

Example 15

22 grams of diphenylmethane-4,4'-diisocyanate were melted and 10 grams of isatoic anhydride were added at 250° F. After 19 minutes at 540° F., a dark brown foam developed and solidified.

*Comparative test A.*—One mole of phthalic anhydride and one mol of diphenylmethane-4,4'-diisocyanate were heated for one hour up to 600° F. Upon cooling, no useful resinous material or foamed product was obtained.

*Comparative test B.*—One mole of phthalic anhydride, one mole of benzoic acid and two moles of diphenylmethane-4,4'-diisocyanate were heated. Some gas evolution took place but then ceased. No polymer was formed upon further heating.

Example 16

Hard tough non-porous coatings may also be obtained with the polymers of the invention by dissolving suitable "prepolymers" in an organic solvent.

To form a suitable resin, the anhydride reactant is dissolved in the liquid diisocyanate reactant to form a homogeneous liquid solution. Some reaction occurs during the formation of the solution so that the solution includes some reaction product as well as unreacted diisocyanate and anhydride. If the heating and agitation of the solution are discontinued at about the point of formation of the homogeneous liquid solution, and the solution is cooled, a solid resin product is obtained. Alternatively, the heating and agitation may be continued for increasing periods of time to a point short of that at which the liquid would form an expanding foamy mass.

The resin product obtained at different stages of the reaction becomes less soluble in organic solvents as the time of reaction increases. (A foamed resin is essentially insoluble in even the more aggressive organic solvents.) The resin produced at the shorter reaction times is soluble in esters and ketones, such as ethyl acetate or dimethylketone, and cyclohexanone. When the reaction has been carried out to the point just prior to the formation of an expanding foamy mass, a solvent such as dimethylformamide or dimethylacetamide is required.

The above-described "soluble resin" is stable and may be stored for appreciable periods of time with precautions against atmospheric moisture. The resin may be easily broken into small particles or ground to powders.

Solutions of this resin in organic solvents can be used to lay down coatings of the resin on surfaces. Upon baking at say about 400° F., a tough, adherent coating is obtained. In the case of the less soluble resins, tough surface coatings are obtainable that are non-brittle. Various fillers and pigments may be added to the solution in order to form surface coatings of the enamel type.

Cellular plastic products can be prepared from the soluble resins by melting the soluble resin to obtain a liquid and continuing to heat and agitate the liquid to a high viscosity (as though forming foamed resin directly from the initial reactant); terminating the heat and agitation and permitting the liquid to react further, forming the expanding foamy mass and permitting the foamy mass to solidify producing a cellular plastic product. The foamed resin products obtained from the soluble resin are identical in physical and chemical characteristics to those foamed resin products obtained directly from the reactants according to the procedure described above.

The physical properties of the products of the examples herein were obtained by the following methods:

Compression set—ASTM D–1564, Modification B using 10% compression.
Compressive strength and modulus—ASTM 1621–59T.
Tensile strength, tensile elongation—ASTM D–1623–59T, Type B.
K factor—Du pont thermal conductivity tester, Model 2.
Open cell content—Journal of the Society of Plastic Engineers, p. 321, March 1962.

The infrared spectra shown in FIGURES 1, 2, 3 and 4 were obtained on mineral oil mulls of the finely ground materials.

While the invention has been described in conjunction with specific examples thereof, these are illustrative only. Accordingly, many alternatives, modifications, and variations will be apparent to those skilled in the art in the light of the foregoing description, and it is therefore intended to embrace all such alternatives, modifications, and variations as to fall within the spirit and broad scope of the appended claims.

I claim:

1. A process for producing a thermally stable and chemically inert resin capable of self-foaming which comprises reacting, in the liquid phase, at elevated temperature (1) an organic polyisocyanate, and (2) an aromatic anhydride having at least one additional substituent reactive with an isocyanato group selected from the group consisting of anhydride groups and groups containing Zerwitinoff hydrogens, in a ratio of isocyanato groups to moles of said anhydride of between about 2:3 to 6:1.

2. The process of claim 1 wherein said polyisocyanate is an aryl polyisocyanate.

3. The process of claim 1 wherein the anhydride is pyromellitic dianhydride.

4. The process of claim 1 wherein the anhydride is trimellitic anhydride.

5. The process of claim 1 wherein the isocyanate is diphenylmethane diisocyanate.

6. The process of claim 1 wherein the isocyanate is polymethylene polyphenyl polyisocyanate.

7. A method for preparing a prepolymerized intermediate useful for forming solid polymeric products of trimellitic anhydride and aryl polyisocyanates which comprises:

reacting trimellitic anhydride with a polyisocyanate having at least two interconnected aromatic rings with at least one isocyanato group per ring in the liquid phase in proportions of said polyisocyanate to said anhydride to provide isocyanato groups to moles of said anhydride in the approximate ratio of 2:3 to 6:1, maintaining an elevated temperature from about 300° F. to about 700° F. for a time sufficient to carry out the reaction between the aforesaid reactants to the desired extent, agitating the reaction mass throughout the reaction period, and cooling the resulting reaction mass to recover a solid reaction product.

8. The method of claim 7 in which a substantial excess of trimellitic anhydride relative to the polyisocyanate is employed.

9. A method for forming a solid foam product which comprises mixing a prepolymerized intermediate product produced according to the method of claim 8 with additional polyisocyanate to bring the ultimate proportions of polyisocyanate to trimellitic anhydride in the mixture to provide ratios of isocyanato groups to moles of said anhydride within the range of 2:1 to 3.6:1, and heating the resulting mixture under conditions permitting release of carbon dioxide gas formed thereby to a temperature in the approximate range of about 350 to 500° F.

10. A method for forming a solid foam product from trimellitic anhydride and polyisocyanate which comprises subjecting to further reaction a prepolymerized intermediate product produced according to the method of claim 7 wherein said ratio of isocyanato groups to moles of said anhydride is between about 3.3:1 and 2.8:1 by heating said intermediate to a temperature of about 500° F to obtain a solid foam product.

11. As a composition of matter a solid polymeric reaction product of trimellitic anhydride and an aryl polyisocyanate which polyisocyanate contains at least two interconnected aromatic rings having at least one isocyanato group per aromatic ring wherein the proportions of said polyisocyanate to trimellitic anhydride provide isocyanato groups to moles of said anhydride in the approximate ratio of 2:3 to 6:1.

12. The composition of claim 11 wherein the proportions of said polyisocyanate to said anhydride provide isocyanato groups to moles of said anhydride of from about 2:1 to 3.6:1.

13. A composition of claim 12 wherein said ratios respectively are between about 2.2:1 and 2.8:1.

14. The composition of claim 11 wherein said isocyanate contains only two aromatic rings, said rings being bridged to each other.

15. An article of manufacture which comprises a solid foam product consisting essentially of a polymeric reaction product of trimellitic anhydride and a polyisocyanate which polyisocyanate contains at least two interconnected aromatic rings having at least one isocyanato group per aromatic ring, wherein the proportions of polyisocyanate to trimellitic anhydride provide isocyanato groups to moles of said anhydride in the approximate ratio of 2:1 to 3.6:1, and wherein the product has a fine, uniform cellular structure and a density in the range of about 1 to 4 pounds per cubic foot.

16. An article of manufacture which comprises a dense solid homogeneous resin which consists essentially of a polymeric reaction product of trimellitic anhydride and a polyisocyanate which polyisocyanate contains at least two interconnected aromatic rings having at least one isocyanato group per aromatic ring, wherein the proportions of polyisocyanate to trimellitic anhydride provide isocyanato groups to moles of said anhydride in the approximate ratio of 2:1 to 3.6:1, and which is susceptible to compression molding.

No references cited.

LEON J. BERCOVITZ, *Primary Examiner.*

G. W. RAUCHFUSS, *Assistant Examiner.*